Dec. 8, 1936.   R. F. TABER   2,063,275
APPARATUS FOR MEASURING THE STIFFNESS OF FLEXIBLE MATERIALS
Filed Aug. 7, 1934   7 Sheets-Sheet 1

Inventor
Ralph F. Taber,
Attorney

Dec. 8, 1936.   R. F. TABER   2,063,275
APPARATUS FOR MEASURING THE STIFFNESS OF FLEXIBLE MATERIALS
Filed Aug. 7, 1934   7 Sheets-Sheet 2
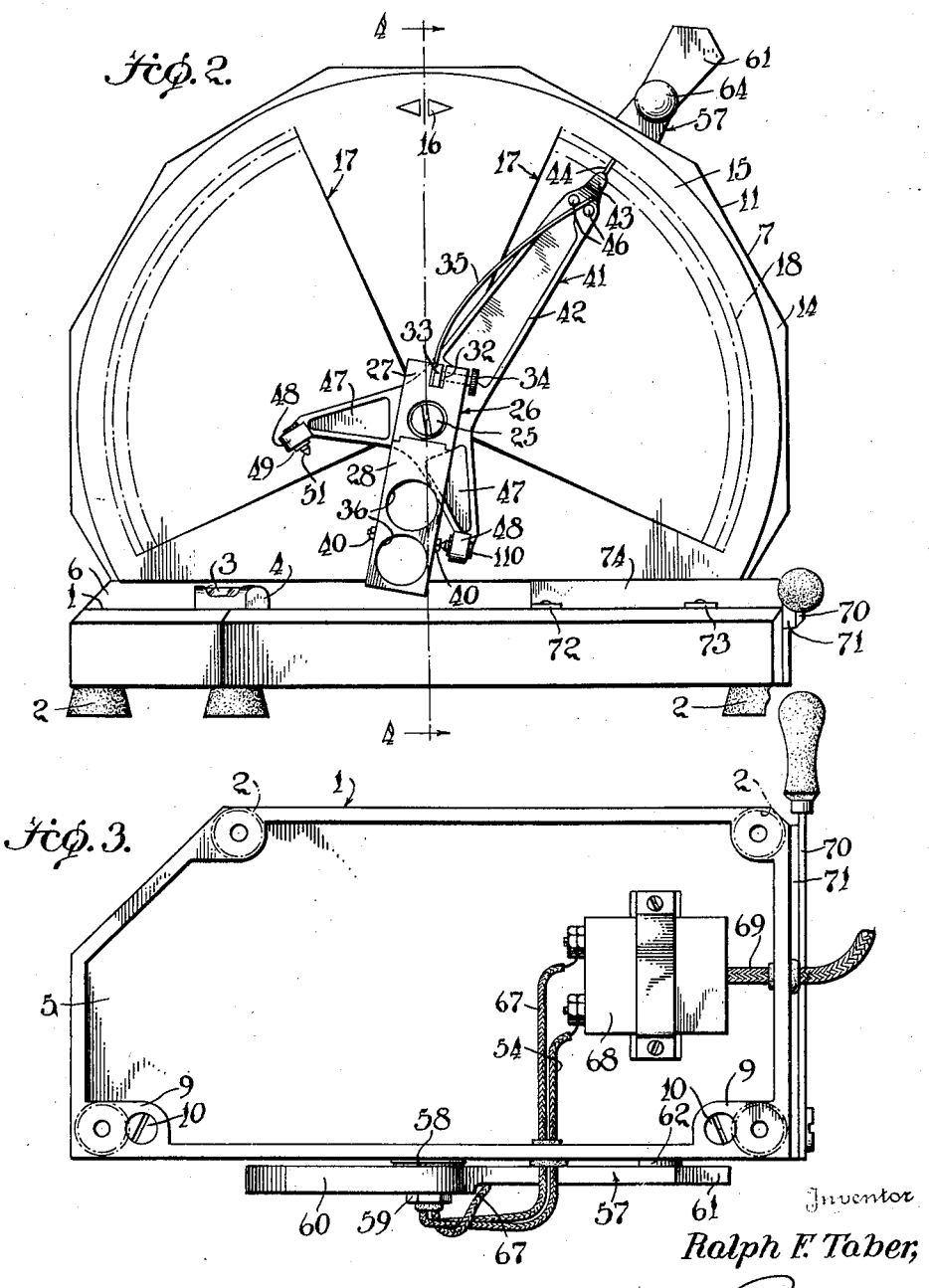
Inventor
Ralph F. Taber,
By
Attorney Dec. 8, 1936.  R. F. TABER  2,063,275
APPARATUS FOR MEASURING THE STIFFNESS OF FLEXIBLE MATERIALS
Filed Aug. 7, 1934  7 Sheets-Sheet 3
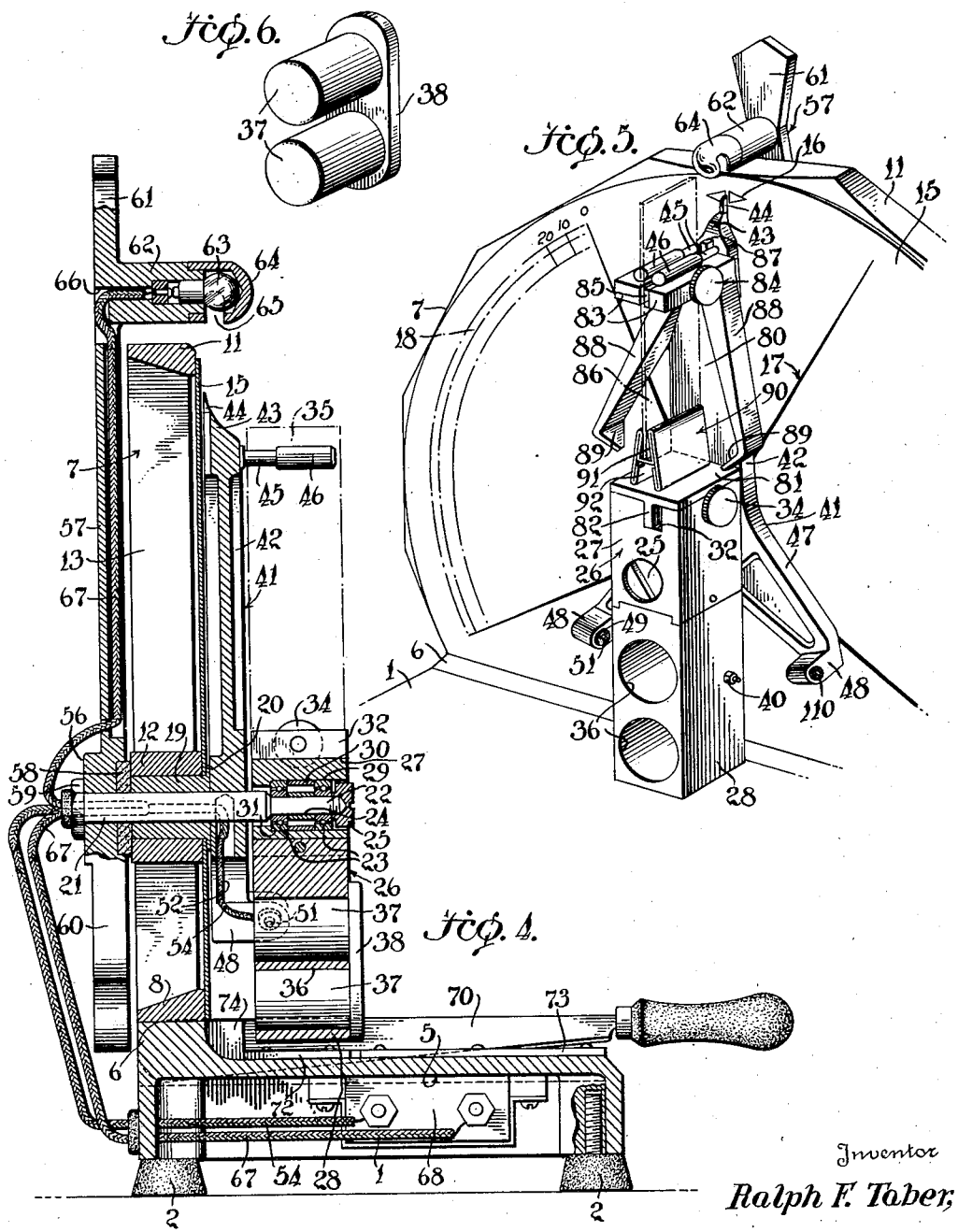
Inventor
Ralph F. Taber,
By
Attorney Dec. 8, 1936.  R. F. TABER  2,063,275
APPARATUS FOR MEASURING THE STIFFNESS OF FLEXIBLE MATERIALS
Filed Aug. 7, 1934  7 Sheets-Sheet 4
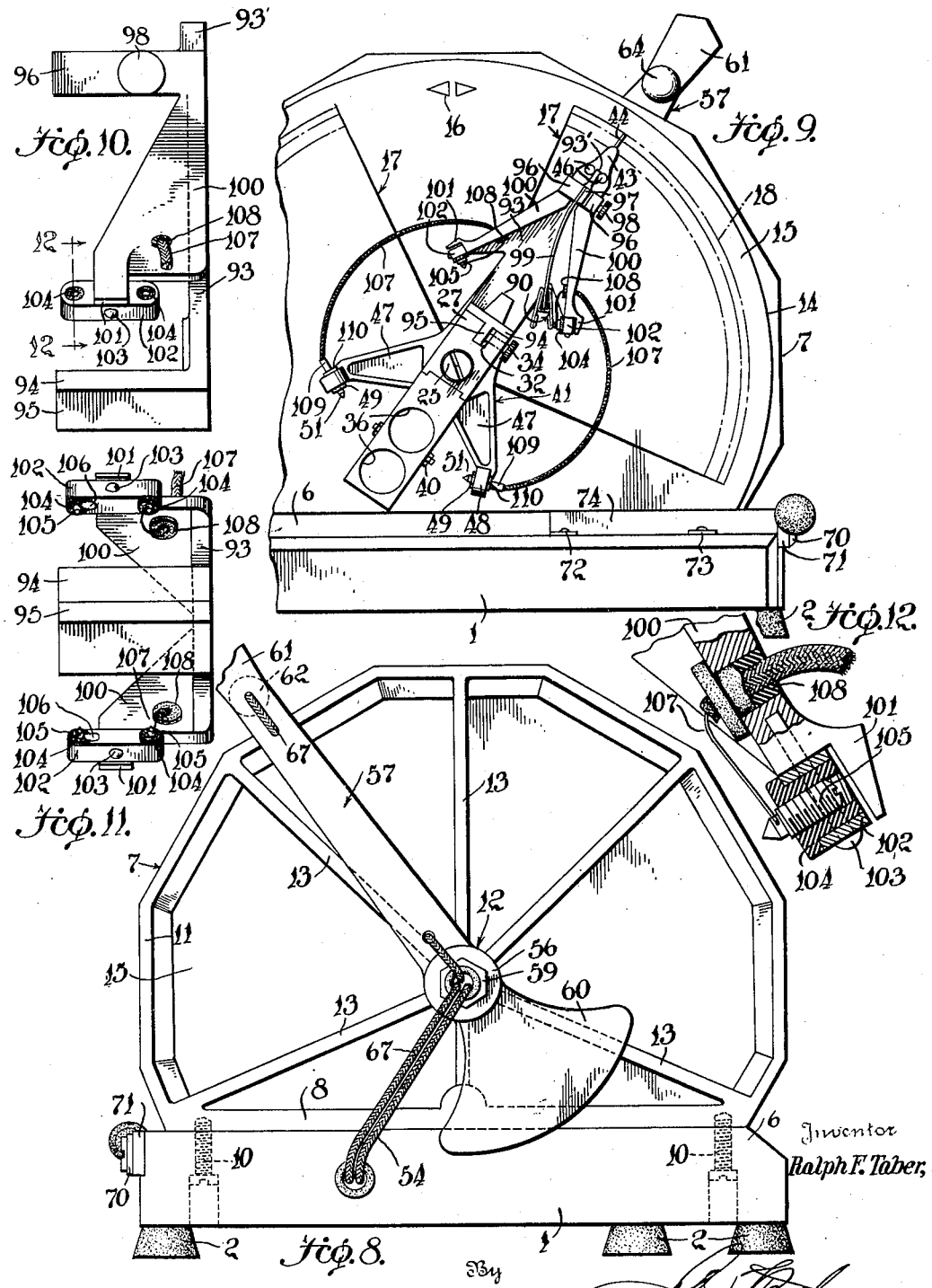
Inventor
Ralph F. Taber,

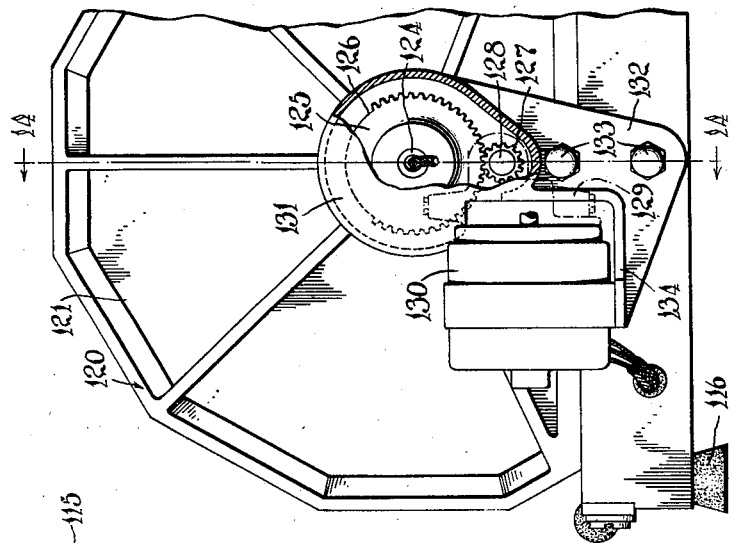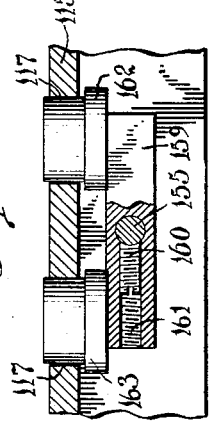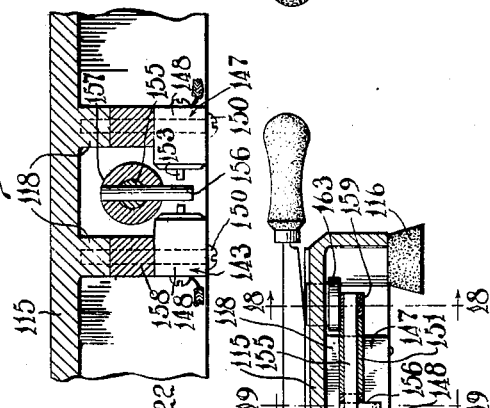

Dec. 8, 1936.  R. F. TABER  2,063,275
APPARATUS FOR MEASURING THE STIFFNESS OF FLEXIBLE MATERIALS
Filed Aug. 7, 1934   7 Sheets-Sheet 6
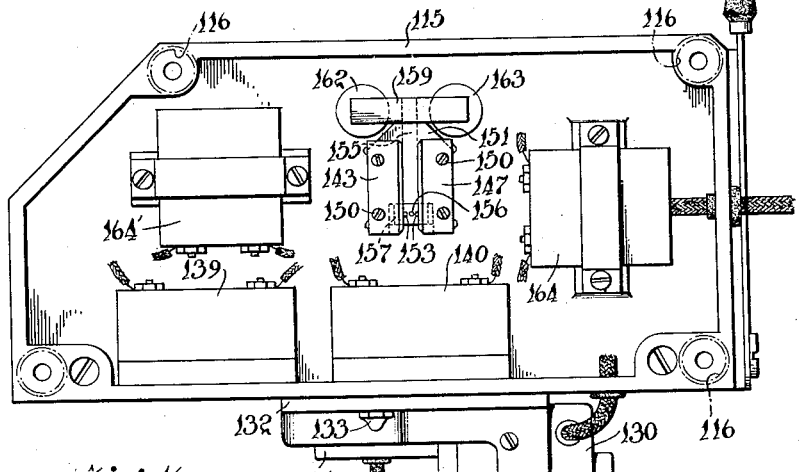
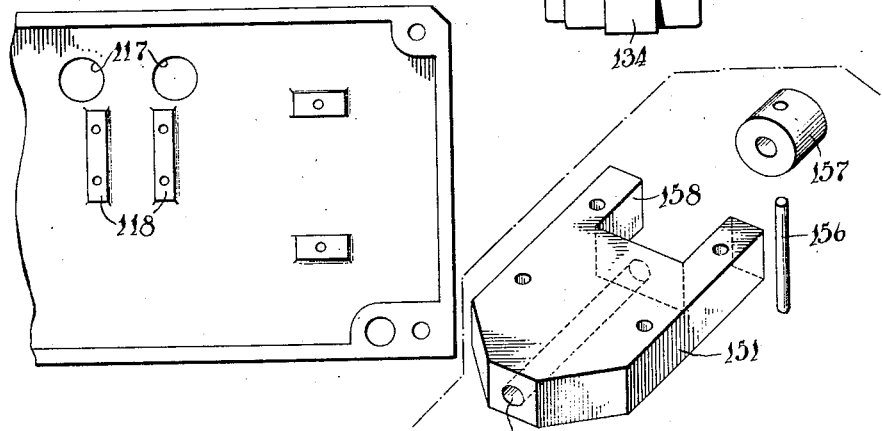
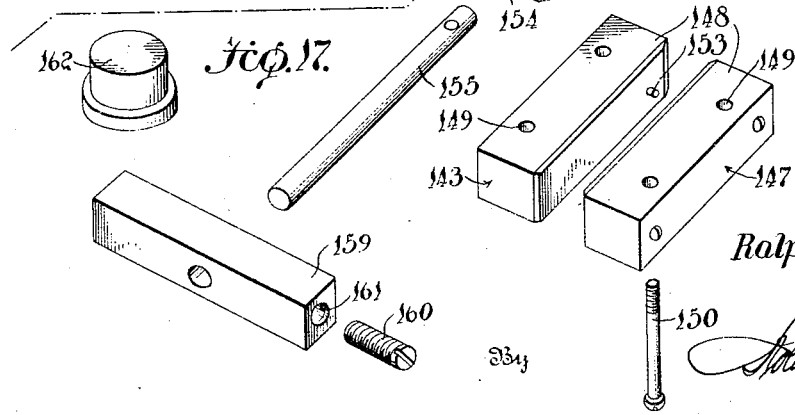
Inventor
Ralph F. Taber Inventor
Ralph F. Taber,
By
Attorney Patented Dec. 8, 1936

2,063,275

UNITED STATES PATENT OFFICE 2,063,275

APPARATUS FOR MEASURING THE STIFFNESS OF FLEXIBLE MATERIALS

Ralph F. Taber, North Tonawanda, N. Y.

Application August 7, 1934, Serial No. 738,792

34 Claims. (Cl. 265—17)

This invention relates to improvements in apparatus for testing and measuring the stiffness of flexible materials such as paper, cardboard, fibrous materials, leathers, imitation leathers, metal foil, filaments, spring wire and strip, textiles, sheet metal and other similar materials.

The invention in this application is an improvement on the invention disclosed in the application of George H. Smith, Serial No. 614,517, filed March 31, 1932.

The invention comprehends the improving of an apparatus for measuring the stiffness of flexible materials by providing a pair of members for manipulating a test strip that are relatively movable to bend the strip and have suitable means for limiting the movement of the members in each direction relative to each other so that the bending of the strip is limited to a given amount. The members manipulating the strip directly co-operate or may have any suitable means actuated in the relative movement thereof for limiting the movement of the members to said given amount. A separate handle or operating lever is provided for operating one of the members for flexing the strip so that it may be manually actuated in a convenient manner while the other member is suitably actuated by any desirable form of force exerting means, such as a weight. The handle for actuating one of the members may also be eliminated and suitable motor actuated means provided for operating the member with suitable means for manually or automatically controlling the operation of the motor to flex the strip through the operation of the one member relative to the other a given amount.

Suitable control means are provided for controlling the motor operation so that the strip is flexed a given amount automatically and the motor means arrested to stop relative movement of the members when the strip being measured is flexed the desired amount.

The invention further comprehends the provision of suitable signalling means to indicate when the strip has been flexed the given amount which may be mounted either on the base of the apparatus or preferably on the operating handle so as to illuminate the scale of the register or dial for indicating and reading the stiffness index of the material when it has been flexed a given amount. The indication may be obtained by any suitable means, such as electrical circuit operated mechanism controlled by contact members that are engaged to close the circuit when the members for flexing the strip have been moved a given amount relative to each other.

The invention provides an attachment for the testing instrument or apparatus for holding and flexing unusually fine flexible materials, such as fine thread, wire and fine textile fabrics, and other delicate materials. The attachment operates with the apparatus in such a way that the same registering means is used to indicate the stiffness of the materials, and also cooperates with the controlling and actuating mechanism of the apparatus so that they are operated in their usual manner in measuring stiffness, although the stiffness units registered with the attachment will be fractional parts of the stiffness units as registered by the apparatus when used without the attachment.

The invention further provides for the measurement of not only the initial stiffness of materials with considerably greater precision than the device disclosed in the co-pending application hereinabove referred to, but also provides for the measurement of basic stiffness of materials so that the amount of plastic flow in the material can be determined, and from these measurements, the elastic properties of the material tested can be calculated. The term "initial stiffness" is the stiffness indicated by the register of the apparatus in the initial flexing or bending of a test strip a given amount. By leaving the test strip in a bent condition at its position of initial flexing or bending, plastic flow will occur in the material that usually reaches a limit after a time interval varying in different materials so that by taking subsequent readings on the apparatus following the reading of initial stiffness, the change in the stiffness of the test strip and the interval of time for such change can be recorded until the plastic flow has substantially ceased at which time the stiffness reading of the apparatus will register the "basic stiffness" of the test strip.

The invention also comprehends the provision of novel supporting structure and novel features in the mounting of the registering means, strip holding and flexing mechanism, together with the automatic operating and control means for flexing a test strip in obtaining a record of its stiffness, which will all be fully pointed out in the following description and claims.

In the drawings showing the present preferred manner of constructing the invention, Fig. 1 shows the improved testing apparatus in perspective with the parts holding a test strip in normal or unstressed relation.

Fig. 2 is a front elevation of the apparatus with a test strip flexed a given amount and registering its stiffness.

Fig. 3 is a bottom plan view of the apparatus.

Fig. 4 is a vertical cross section taken on line 4—4 of Fig. 2 with the parts shown in position to hold a strip in its normal or unstressed relation.

Fig. 5 shows a fragmentary portion of the testing apparatus in perspective similar to Fig. 1 and a testing attachment for very pliable material applied in operative position with a test strip supported therein in normal or unstressed relation.

Fig. 6 shows the detachable weight for increasing the testing range of the apparatus, in perspective.

Fig. 8 is a rear elevation of the apparatus as shown in Fig. 2.

Fig. 9 is a fragmentary front elevation of a testing apparatus similar to that shown in Fig. 2 with a sensitive attachment slightly different from that shown in Fig. 5 applied in operative position showing the limit of flexing of a test strip in the attachment, the attachment being provided with circuit closing means for electrical indicating and control mechanism.

Fig. 10 is a side elevation of the sensitive attachment shown in Fig. 9.

Fig. 11 is a bottom plan view of the sensitive attachment shown in Fig. 9.

Fig. 12 is an enlarged detail sectional view taken on line 12—12 of Fig. 10 with additional portions broken away and shown in section to illustrate details of construction of the contact means on the attachment.

Fig. 13 is a rear elevation of a stiffness measuring apparatus similar to that shown in Fig. 1 provided with electric motor operated means for flexing the test strip and control means for the motor.

Fig. 14 is a cross section taken on line 14—14 of Fig. 13.

Fig. 15 is a bottom plan view of the motor driven stiffness tester shown in Fig. 13.

Fig. 16 is a fragmentary bottom plan view of the base member for the apparatus shown in Fig. 15 with parts removed to show the details of construction of the base member.

Fig. 17 shows the switch mounting and operating assembly structure in perspective and disassembled relation.

Fig. 18 is an enlarged vertical cross section taken on line 18—18 of Fig. 14.

Fig. 19 is an enlarged cross section taken on line 19—19 of Fig. 14.

Figures 1, 7:
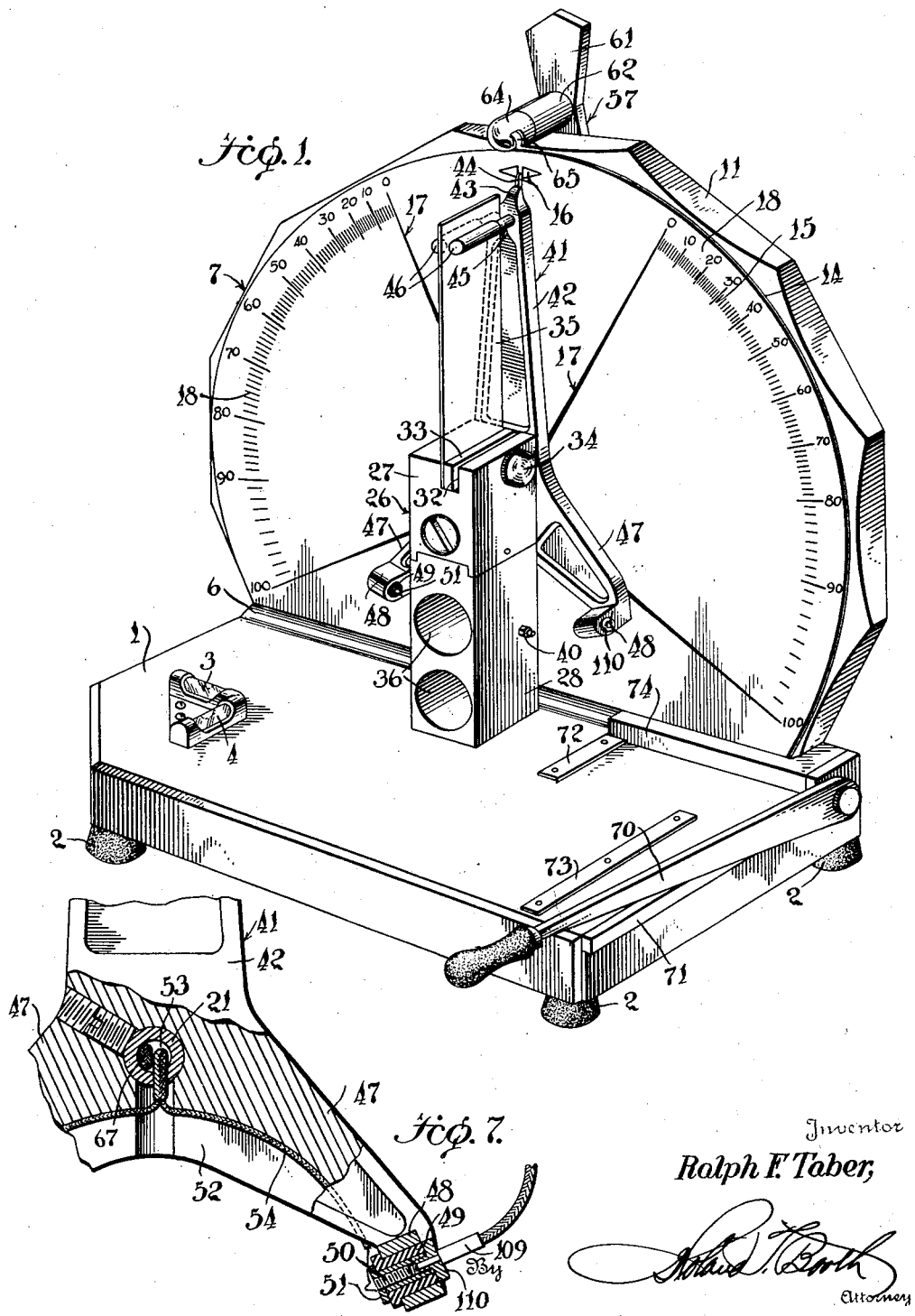
Fig. 7 is an enlarged detail showing a fragment of one of the flexing members, indicator arm, or pointer, with portions broken away and shown in section to illustrate details of construction.

The apparatus of this invention has a base 1 supported on legs 2 adjustably mounted on base 1 as shown in Fig. 4, so that each leg may be independently adjusted to vary the height and level the base on a supporting table or the like. A pair of levels 3 and 4, Fig. 1, are mounted on the upper face of base 1 in right angular relation for use in levelling the base through the adjustment of legs 2. As shown in Figs. 3 and 4 the base has a recess in the bottom indicated at 5. The rear edge of the base is formed with an upwardly extending flange 6 having a supporting frame 7 provided with the lower frame bar 8 seated on said flange 6. Bosses are formed at the rear corners of the base at 9, Fig. 3, formed with openings to receive attaching screws 10 to effectively secure the supporting frame to the base.

This supporting frame has a substantially semi-circular edge frame strip 11 having opposite ends secured to lower frame bar 8 as clearly shown in Fig. 8 and extending upwardly from said bar. A bearing support 12 is provided with radially extending webs 13 connected at the ends to edge frame 11 and frame bar 8, see Fig. 8. This supporting frame 7 constructed in this manner has been preferably made as a casting, the forward edge of edge frame strip 11 being provided with a face or seat portion 14 for receiving the marginal portion of dial plate 15, Fig. 4. The lower edge of dial plate 15 engages the front face of frame portion 8 as shown in Fig. 4. The index position is indicated at 16, Fig. 1, on the dial plate, while lines 17 at either side of the index 16 on the dial plate indicate the beginning of the scale provided in circular form around the margin of the dial plate as illustrated in Fig. 1 for indicating the stiffness index of material in a manner that will be hereinafter described.

The graduations indicating stiffness extend in opposite directions from the lines 17 toward opposite ends of the base, the stiffness index scale being designated by the numeral 18. This scale is arranged in concentric relation to bearing 12 of frame 7 and the dial plate has an opening registering with bearing 12. A sleeve bearing 19, (Fig. 4), has a driving fit in bearing 12 and has a flange 20 on the forward end engaging the front face of dial plate 15 and serves to retain it in position against the front face of supporting frame 7 with the edge portion seated on seat portion 14 on edge member 11. The outer face of flange 20 provides an end bearing in a manner hereafter described. A shaft 21 is rotatably mounted in bearing sleeve 19 and has a reduced extension 22 on the forward end portion thereof mounting a pair of ball bearing assemblies 23 in spaced relation as shown in Fig. 4 with a spacing sleeve 24 between said assemblies so that a threaded head 25 may be screw threaded on the reduced extension 22 for rigidly retaining the ball assemblies in the proper position on said shaft extension.

A holder member 26 comprises a clamping block 27 and a pendulum weight 28 secured together in rigid relation as clearly shown in Figs. 1 and 4, the clamping block being provided with a cylindrical bore 29 for receiving bearings 23. The outer races of ball bearing assemblies 23 are spaced by sleeve 30 fitting in bore 29 and retained by a set screw so that one of said ball assemblies will engage shoulder 31 thereby positioning the ball bearings in proper relation in the clamping block to secure free suspension of the clamping block on shaft extension 22 in properly balanced relation.

Clamping block 27 is provided with a transverse slot 32 in the upper face slidably receiving a clamping bar 33 operable in slot 32 by actuation of screw member 34 to clamp one end of a test strip 35 in said clamping block in the manner illustrated in Fig. 1. These parts are constructed with precision so that the lower end of test strip 35 will seat on the bottom of slot 32 and properly gauge the position of the strip in the holder member. When the strip is thus clamped in the holder member the pendulum weight 28 and the mounting of the holder member on shaft extension 22 is properly balanced and will support the test strip in normal or unstressed relation in the testing apparatus. The pendulum weight 28 is provided with a pair of cylindrical openings 36 extending transversely through weight 28 from the front to the rear thereof as clearly shown in Figs. 1 and 4 for receiving the cylindrical portions forming part of an auxiliary weight 37 having the cylindrical portions joined by plate 38, this weight being so arranged that the cylindrical portions will engage in openings 36 and when inserted into said openings with plate portion 38 engaged with the front face of pendulum weight 28, a properly balanced pendulum weight construction will be provided for use in connection with testing the stiffness of a test strip 35. The weight as shown in Fig. 6 increases the range of the instrument in a given multiple higher than the capacity that can be obtained through the use of the pendulum weight 28 alone.

Each side of pendulum weight 28 is provided with a contact point 40 for a purpose that will be presently described.

It will be noted from Figs. 1 and 4 that holder member 26 is mounted in spaced parallel relation with respect to dial plate 15. A flexing member, indicator or pointer 41 is mounted between holder member 26 and dial plate 15 on the front end of shaft 21. This member 41 has a main arm 42 tapered toward a point at one end as shown at 43, the said end 43 being provided with a slot having an indicator or pointer strip 44 secured therein and formed with a pointed free end. The end portion of arm 43 carries a pair of laterally projecting spaced pins 45 rotatably carrying cylindrical rollers 46 on the free ends. These rollers 46 and pins 45 are arranged to provide a sufficient space between the peripheries to receive the end of test strip 35 opposite to that secured in holder member 26 as shown in Figs. 1 and 4, so that relative movement of member 41 to holder member 26 will flex the strip in the holder member in measuring the stiffness index of the strip in a manner that will be hereinafter described.

Pointer strip 44 on the free end of main arm 42 is in position to cooperate with scale 18 on dial plate 15 and it is through this medium that the stiffness index of a test strip is registered in the operation of the apparatus.

The opposite end of main arm 42 is provided with a pair of arms 47 extending outwardly in acute angular relation and provided with laterally extending heads 48 at their free ends projecting into the plane of holder member 26. As shown in Fig. 1 these arms 47 extend to opposite sides of holder member 26.

Heads 48 as illustrated in Fig. 7 are each provided with a cylindrical bore receiving an insulating sleeve 49. A contact screw 50 is screw-threaded in each metal sleeve 51 carried by each of the sleeves 49 and adjustable to vary the position of contact point 50 on the inner end. The contact points 50 are adapted to engage contacts 40 on opposite sides of holder member 26 when holder member 26 has moved relative to main arm 42 a given amount in either direction thereby limiting the amount that holder member 26 may move relative to member 41 in the flexing of test strip 35.

The lower edge portions of arms 47 are provided with a channel 52 as shown in Figs. 4 and 7. The juncture between arms 47 and main arm 42 is provided with a transverse opening to receive shaft 21 in the manner clearly shown in Figs. 4 and 7. Shaft 21 and member 41 are rigidly secured together. Shaft 21 being provided with a central passage 53 as shown in Figs. 4 and 7, for receiving electric circuit cable indicated at 54 that connects with contacts 50 carried by arms 47. This electrical cable 54 forms part of the indicator circuit that will be hereinafter described.

Shaft 21 has the rear end extending beyond the rear end of sleeve 19 where it extends through an opening in boss 56 of operating member 57. Boss 56 is provided with a recess adjacent the end of bearing sleeve 19 for receiving a felt or other suitable washer 58, (Fig. 4), and the end of shaft 21 projecting to the rear of boss 56 is screw-threaded to receive nut 59 for engaging boss 56 and drawing shaft 21 through sleeve 19 to assemble the shaft and the parts carried thereby in bearing sleeve 19.

In screw-threading nut 59 on shaft 21 boss 56 of operating member 57 will be moved inwardly on shaft 21 to compress felt washer 58 against the end of bearing support 12 while the rear face of indicator member 41 will engage the bearing face on flange 20 at the forward end of bearing sleeve 19. This will provide a means of securing sufficient friction to retard the free rotation of shaft 21 and bearing sleeve 19 so that when the apparatus is operated to obtain the stiffness index of a test strip 35, it will remain in any position of adjustment until manually moved by operating member 57.

A counter-balancing weight 60 is formed integral with boss 56 for counter-balancing the weight of operating member 57 provided with handle portion 61 extending beyond the periphery of the dial plate and supporting frame 7. Operating member 57 is formed with a cylindrical boss 62 projecting forwardly beyond the edge of supporting frame 7 and is provided with a conventional socket to receive an electric bulb 63. A cap 64 is detachably mounted on the front end of boss 62 to cover electric bulb 63, said cap being provided with slot 65 so that light from bulb 63 is projected on to dial plate 15 for illuminating graduations 18 immediately adjacent pointer 44. Boss 62 is provided with a passage 66 for circuit wire 67 connected at one end to contact engaging contact on base of indicator light 63, said wire extending along operating member 57 from passage 66 as shown in Fig. 4. Wire 67 then extends through the passage in shaft 21 and forms part of the circuit to contacts 40 and 50 for indicating when a test strip 35 has been flexed a given amount.

Wire 54 extends to one of the secondary terminals of alternating current transformer 68, Fig. 3, mounted in recessed portion 5 of base 1 while a suitable two circuit cable connection 69 connects the transformer primary with a source of electric power. Wire 54 has the end engaged in slot 52 divided into two leg portions in any suitable manner as shown in Fig. 7 for connection to both of the contacts 50. The circuit to indicator light 63 is made through wire 67 extending along operating member 57, (see Fig. 4), a portion being extended into bore 53 of shaft 21 and the end opposite that providing connection to bulb 63 extending to and connecting with the other secondary terminal of transformer 68. The circuit for bulb 63 is grounded to boss 62 and then extends through operating member 57 to shaft 21 to holder member 26 and contacts 40. When either contact 40 engages either contact 50 the circuit to the electric bulb 63 or in other words the secondary circuit of transformer 68 is closed indicating the limit of movement of holder member 26 relative to pointer 41 and in this way the instrument is very sensitive in indicating this limit of movement and the proper index of stiffness of test strip 35.

Test strip 35 must be of fixed size both as to length and width, and for this purpose a shearing knife 70, Fig. 1, is pivotally mounted on one end of base 1 for cooperation with stationary blade 71 detachably secured to the base. Gauge bars 72 and 73 are secured to the upper face of base 1 at the desired distance from the edge of blade 71 to secure the cutting of the proper length and width respectively of the test strip.

A shoulder 74 is formed on base 1 against which the material to be cut is engaged so that it will cooperate with gauge strips 72 and 73 in gauging the position of the strip on the base for cutting. The length of the strip is determined by gauge strip 72, while the width of the strip is determined by gauge strip 73.

In using the instrument as shown in Figs. 1 to 4 and 6 to 8, a piece of paper sheet or other suitable material to be tested is cut to a fixed size to provide the test strip 35 by knife 71 and gauges 72 and 73 cooperating with shoulder 74 as above described. The strip then has one end inserted into groove 32 of holder member 26. Thumb screw 34 is operated to move clamp 33 to engage and clamp the test strip in position in the holder member as clearly shown in Fig. 1, with the lower end squarely seated on the bottom of groove 32. The upper end of the strip is positioned between rollers 46 and pins 45 on member 41 as clearly shown in Fig. 1, when this member is in the position shown in Fig. 1 with pointer 44 at the index position opposite the mark 16. In this position strip 35 is freely supported in a vertical position by holder member 26 due to weight 28 holding the holder member in vertically suspended relation.

To test the strip an operator grasps handle 61 and moves it, for example to the right in Fig. 1, which simultaneously rotates flexing member or pointer 41 to the right and engages one of the rollers 45 with the free end of test strip 35 moving it to the right with member 41. This will produce a flexing of strip 35 in the manner disclosed in Fig. 2.

As handle 61 is moved slowly to the right test strip 35 will gradually flex to a continually greater extent under the action of one roller 46 engaging the end of the strip, and holder member 26 with weight 28 tending to maintain its normally vertical position. By reason of the relative stiffness of strip 35 holder member 26 is deflected out of its normally vertical position and rotated on its bearings on shaft extension 22.

The test strip is only flexed a given amount, equal to an angle of 22½ degrees in the device as illustrated in the drawings, this angle being arbitrarily selected because it facilitates a convenient arrangement of scale divisions with sufficient spacing to afford accurate readings of the stiffness of materials tested and obtain a unit of measurement that will measure fine variations in stiffness. The arbitrary 22½ degree angle is also within the elastic limit of any materials that may be tested in the instrument. A material that has no stiffness will be flexed the 22½ degree angle without deflecting holder member 26 out of its normal position and as a result one of the contacts 50 will engage the contact 40 on the holder member when pointer 44 is over the zero graduation on the scale at the 22½ degree angle which is the origin of the stiffness index scale.

Arms 47 are so arranged on flexing member 41 so that contact points 50 will engage contact points 40 when member 41 has been moved exactly 22½ degrees from the vertical position in either direction with holder member 26 in its normal vertical position. This relative position of these parts is adjusted with considerable precision so that the instrument will be highly sensitive in order to make precision measurements.

When the material in a test strip 35 being tested has stiffness, the pointer 44 and operating handle 61 will be moved past the index 17 at the beginning of the scale to the point where one of the contacts 50 engages its corresponding contact 40 on member 26 and at the instant of such engagement the electric circuit to indicator light 63 will be closed and the light will become immediately illuminated to illuminate dial plate 15 and indicate the position of pointer 44 on the graduations 18 of the scale and the position at which the reading is to be taken thereby indicating the "initial stiffness" of test strip 35. Then by allowing the strip to remain flexed for a period of time varying from three to thirty minutes, for example, and the handle 61 operated in a reverse direction toward the index 16, it will be found that contacts 40 will remain in engagement with contact 50 for part of this return movement of the handle, and as a result a second reading, or a series of readings, may be taken at intervals of any desired length of time, to indicate the scale graduation 18 on which contacts 40 and 50 engage, until a limit has been reached because of the "basic stiffness" of the material being tested where the weight no longer continues to bend the strip sufficiently for the contacts to engage.

For example, when handle 61 is moved to the left as shown in Fig. 1 to bend test strip 35 to the left, the strip will be bent more and more as handle 61 moves to the left until contacts 40 and 50 engage. Assume this gives a reading of 60 on the scale which is preferably recorded as 600 as hereinafter described in connection with Fig. 21. The strip is then left bent in this position for five minutes. Handle 61 is again operated, this time toward the origin of the scale and obviously when it is moved back a sufficient distance contacts 40 and 50 will disengage at some position of its movement. Handle 61 is then moved slowly away from the scale origin until contacts 40 and 50 again engage. This time it is found that they engage at a scale reading which we will assume is 55 showing that after strip 35 remained flexed for five minutes something took place in the material that changed the reading at which contacts 40 and 50 will engage in the flexing of the strip. The relation of these two readings is described hereafter.

The first reading made will be the "initial stiffness" of the strip and the last reading made will be the "basic stiffness" of the strip. Any intermediate readings made at intervals may be used to chart a curve on graph sheets similar to that shown in Fig. 21, for example, illustrating a number of graphs for the different kinds of materials identified in Fig. 21 in terms of stiffness units according to the readings on scale 18 and the time interval of said readings shown on Fig. 21 in minutes.

The difference between the first reading and the last reading for each piece of test material may be used to calculate the resiliency of the material, and the difference between the first reading and the last reading shows the amount of plastic flow that takes place in the material.

Figures 20, 21:
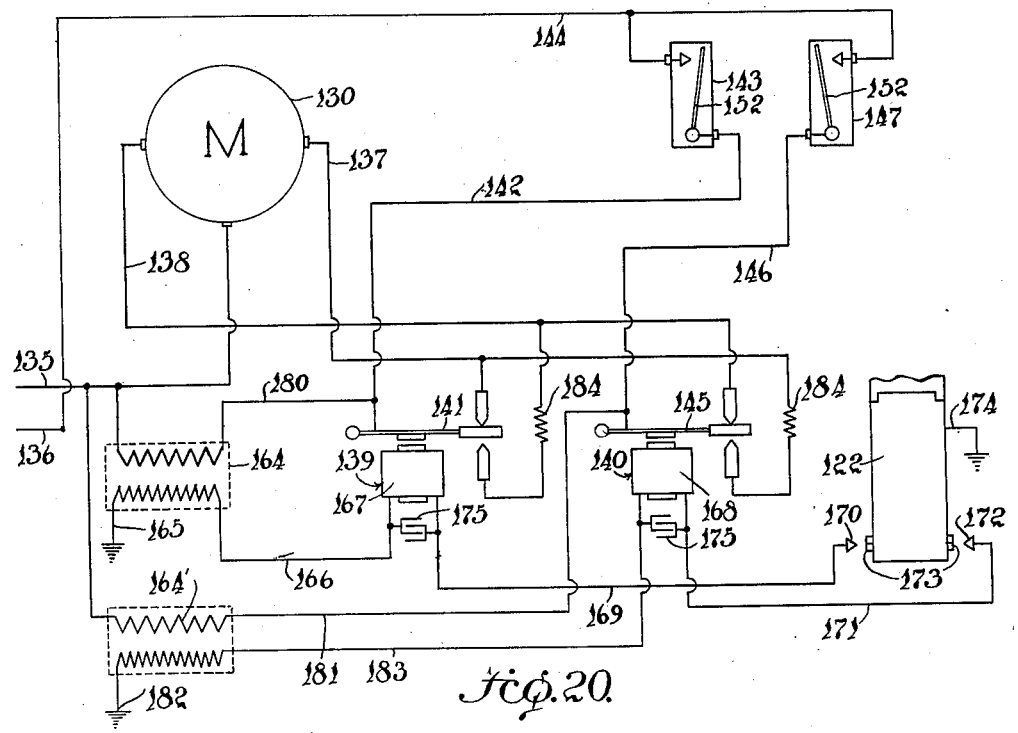
Fig. 20 is a wiring diagram of the electrical supply and control circuits for the motor driven stiffness tester, shown in Figs. 13 and 14.
Fig. 21 is a graph chart showing characteristic stiffness curves of several different materials.

It is to be understood that the graphs shown in Fig. 21 are the result of taking readings on the scale 18 through the operation of handle 61 first in one direction as to the right in the manner explained above, and then in the opposite direction or to the left as shown in Fig. 1. The readings on both sides of the index point 16 are then compared either by averaging or by addition, depending on the scale used, which gives the stiffness of the test strip, and is the result charted in Fig. 21.

The reason for reading the stiffness index of materials by flexing them in both directions is due to the fact that most materials lack perfect homogeneity of mass or possess slight curvature resulting in greater stiffness in flexing in one direction than the other. This variation in the composition of materials frequently changes the stiffness characteristic of the material whether it be fiber, or metal or other type of sheet material, or wire. This variation will permit the material to flex more readily in one direction than it will in the other, so that in order to obtain the proper index of stiffness of the material it is necessary to flex it in both directions, from which information can be obtained as to the stiffness provided by the material in view of the difference in flexing or bending in one direction from that in the opposite direction.

This gives further information regarding the characteristics of numerous materials which is, of course, highly useful in the selection of materials for various commercial uses because obviously some materials that would flex more readily in one direction than the other would not be as suitable for use in some instances as materials that have a more uniform stiffness when flexed in either direction.

The graphs shown in the central portion of Fig. 21 are noted as being made with the "200 unit pendulum" which is holder member 26 constructed as shown in Fig. 1 without the use of the weight illustrated in Fig. 6. The graphs at the right of Fig. 21 illustrate a test made with the use of the weight shown in Fig. 6 applied in the manner hereinabove described to holder member 26. The graphs shown at the left-hand side of Fig. 21 are made with a sensitive attachment for use in the instrument illustrated in Fig. 1, one form of such a sensitive attachment being illustrated in Fig. 5.

The instrument as shown in Fig. 5 is the same as illustrated in Fig. 1 with the sensitive attachment applied in operative position, and comprising a body member 80 provided with a laterally extending plate portion 81 on one end in the central portion of which is formed a perpendicular flange 82 adapted to seat in slot 32 of holder member 26 as illustrated, so that thumb screw 34 may be actuated to rigidly secure the attachment in holder member 26 with the lower face of plate portion 81 seated on the upper face of clamping block 27. The clamping bar 33 is removed with this form of attachment.

The upper or other end of body member 80 is provided with a pair of spaced parallel laterally extending jaws 83 parallel to plate 81. One of the jaws mounts a thumb screw 84 and a clamping bar 85 movable in the operation of thumb screw 84 toward the other jaw so as to clamp the end of a test strip 86 between the jaws in the manner illustrated in Fig. 5.

A projection 87 from the upper end of body member 80 extends between pins 45 of flexing member 41 and operates to retain members 26 and 41 in connected relation against relative movement. A pair of arms 88 are formed on body member 80 at the juncture of the body member and jaws 83, from which the arms extend in diverging relation toward plate member 81 and in inclined relation relative to body member 80, (Fig. 5). The ends of these arms 88 terminate in lateral extensions 89 having the free ends arranged in position to limit the flexing of the test strip in jaws 83 to a given amount equal to 22½ degrees in the structure as illustrated.

In testing strip 86 in the attachment the lower free end may have a weight member 90, (Fig. 5), secured thereto. This weight is in the form of a light-weight sheet metal clip having the weight thereof fixed in order to secure readings on scale 18 that will have a definite proportionate relation to the scale readings taken through the use of holder member 26. For this purpose weight 90 is formed of a strip of sheet metal provided with a U-shaped portion 91 having the free ends of the U-shaped member 91 adapted to resiliently move toward each other. The free ends of the strip are folded outwardly onto the outer sides of the legs of the U-shaped member 91 and extend beyond the bottom of the U-shaped portion 91 where they are extended inwardly toward each other as indicated at 92, the ends being folded inwardly upon each other.

With weight 90 applied to the end of a test strip 86 as shown in Fig. 5, it is inserted into the attachment so that the free edge of weight or clip 90 will lightly engage the central portion of plate 81 in which position thumb screw 84 is operated to firmly clamp the test strip in the attachment. The strip may have a free end extending above the jaws 83 which is immaterial in making the test of strip 86. Handle 61 of operating member 57 of the instrument is then operated in the manner hereinabove described until the side portion of clip 90 engages the end of lateral extensions 89 at which point a reading of the pointer 44 on scale 18 will be taken indicating the stiffness of the test strip. These readings are taken in both directions to the right and left of the index 16 in the same manner as previously described and the stiffness of the material charted if desired, as illustrated at the left-hand portion of Fig. 21, where the graphs of two different types of materials taken on the sensitive attachment are illustrated. Numerous other graphs could be shown but this is not believed necessary as the graphs illustrated fully illustrate how the attachment of Fig. 5 operates to register "initial" and "basic" stiffness.

Another form of sensitive attachment is illustrated in Figs. 9 to 12. This attachment has a body member 93 provided with plate 94 extending laterally from one end of body member 93 and formed with a perpendicular flange 95 engaging in slot 32 held in position by thumb screw 34. The upper or opposite end of body member 93 is formed with jaws 96 arranged in spaced parallel relation to each other and plate 94. Also a projection 93' is provided to engage between pins 45 of flexing member 41.

A clamping bar 97 carried by one of the jaws through the medium of a thumb screw 98 threaded in one jaw is movable toward and from the opposite jaw in the operation of the thumb screw for clamping the end of a test strip 99 in jaws 96 with a clip or weight 90 applied on the free end in the manner hereinabove described and positioned to lightly engage the upper face of plate 94 in the positioning of test strip 99 in the attachment.

Body member 93 is formed with a pair of arms 100 extending in inclined and diverging relation from the end of the body member adjacent jaws 96 and provided at the free ends with terminal portions 101 that are offset, as illustrated in Figs. 9 and 12, to provide a seat for contact supporting block members 102 pivotally mounted on the ends of the arms by means of pins 103.

The ends of each block 102 are formed with an opening rigidly mounting an insulating sleeve 104 and carrying a screw-threaded contact member 105. One contact member on each member 102 is grounded as indicated at 106 to said member and a flexible wire 107 is connected to the other contact 105 of each member 102. This wire 107 is extended through an insulating bushing 108 in an opening formed in each arm 100 as clearly shown in Figs. 9, 11, and 12. The end of each wire 107 is provided with a contact tip 109 of conventional form detachably engaged in tip socket 110 shown in Figs. 7 and 9 mounted in sleeve 51 carried by arm 47, and providing electrical circuit with contact screw 50, so that a circuit may be completed through the pair of contacts in each contact block 102 with the indicator light, through the medium of the circuit being closed by clip 90 engaging contact pins 105 on either block 102 when the strip is flexed the given amount as shown in Fig. 9.

Each block 102 is pivotally mounted on the end of arm 100 in order that it may readily move when engaged by clip 90 so that the circuit may be closed readily upon the clip engaging either contact member and moving into the proper position for the given flexing of the test strip 99 and thereby accurately measure the stiffness of the test strip and indicate this measurement by energization of the signalling circuit and lamp or signal light 63. The further operation of the attachment shown in Figs. 9 to 12 and the manner of attaching it in position in the instrument shown in Fig. 1 and also clearly illustrated in Fig. 9 will be readily apparent from the description of the attachment shown in Fig. 5 as both attachments operate in the same manner with the addition that the attachment shown in Fig. 9 controls the operation of the indicator circuit in the manner described, and also provides a means for further control of electric control apparatus in a manner hereinafter described.

The invention as hereinabove described shows the construction and operation of an improved manually operated testing instrument through securing the movement of flexing members 26 and 41 by manually actuating handle 61 with the provision of an electric indicating means for determining with precision when the test strip has been flexed a given amount equal in the disclosure as hereinabove stated to 22½ degrees. This instrument may be readily adapted for power actuation to obtain the testing of material in a highly efficient and uniform manner with considerable precision. Any suitable means may be provided for supplying such power actuation, one suitable means being disclosed in Figs. 13 to 20.

A base 115 constructed in a similar manner as base 1 is provided with adjustable feet 116, and is different from base 1 in that it is provided with openings 117 and bosses 118. This base will be provided with the usual shearing knife and gauge members provided on the base 1 and the usual levelling means provided on base 1 which are not illustrated in Figs. 13 to 20 in view of the illustration in Fig. 1, and the fact that the base construction other than as above described is a substantial duplicate of base 1.

A supporting frame 120 is constructed in exactly the same manner as frame 7 and is mounted on the base 115 in the same manner as frame 7 is mounted on base 1. A dial plate 121 corresponding to dial plate 15 is mounted on frame 120. A duplicate assembly of holder member 26 and flexing member 41 is indicated at 122 and 123 respectively, for supporting and actuating a test strip, such assembly being a duplicate of that illustrated in the construction previously described and shown in Figs. 1 and 4. Operating member 57 is omitted in the disclosure in Figs. 13 to 20, and a shaft 124 similar to shaft 21 is provided, in which the rear end of the shaft is constructed in a slightly different manner from shaft 21 by having the end formed to rigidly mount a gear 125. This gear is segmental having a portion of its periphery indicated at 126 formed without gear teeth in order to limit the movement of pointer or flexing member 123 in opposite directions to the limit of the scale on dial plate 121 in a manner that can be clearly understood from an inspection of Fig. 1 showing the limit of the scale on the dial plate adjacent to the bottom of frame member 7 on either side of the plate. This provides for obtaining full readings on the scale for the instrument and preventing over-travel that might cause damage.

Segmental gear 125 is operated by drive pinion 127 intermeshing therewith as shown in Figs. 13 and 14. Drive pinion 127 is mounted on shaft 128 of reduction gearing carried in the reduction gear unit 129. The reduction gear unit 129 contains a conventional type of reduction gearing so constructed that shaft 128 can be rotated at a low speed and can be driven from an electric motor 130 of conventional form on one end of which reduction gear unit 129 is mounted.

A casing 131 encloses gear 126 and pinion 127 as clearly shown in Figs. 13 and 14 and forms part of a supporting bracket 132 bolted to the rear face of frame 120 and base 115 as shown in Fig. 13, the bolts being indicated at 133. This bracket is provided with a shelf 134 mounting motor 130 and reduction gear unit 129.

The motor 130 will be of a conventional type having a substantially constant speed and this motor and reduction gear unit 129 is a conventional type that comes in assembled form so that either a D. C. or an A. C. current motor may be provided according to where the instrument is to be used and the kind of circuit it is to be used on, that is direct current or alternating current supply circuit. As alternating current is most generally used, the drawings illustrate the construction adapted for an alternating current supply circuit indicated in Fig. 20 as having a pair of main circuit wires 135 and 136 for supplying the current for the operation of the motor. Motor 130 is provided with three terminals as illustrated in Fig. 20, circuit 135 being connected to one of the terminals and circuit connections 137 and 138 being connected to the other two terminals respectively.

Circuit wire 137 is connected to a stationary terminal of each of two relays 139 and 140 respectively. Relay 139 has an armature 141 spring actuated in deenergized relation to engage the stationary terminal connected with circuit wire 137 for closing the circuit to wire 142 connected to one terminal of switch 143. The other terminal of switch 143 is connected by circuit wire 144 to main circuit wire 136, completing electrical circuit connection with the source of current supply when armature 141 of relay 139 and switch 143 is in position to close the proper contacts thereof.

Relay 140 has an armature 145 actuated in energized relation to engage the stationary contact connected with wire 137 for closing the circuit to wire 146 connected to one terminal of switch 147, the other terminal of switch 147 being connected to circuit wire 144. Relay 140 and switch 147 operate to control motor circuit 137 independently of the control imposed on circuit 137 by relay 139 and switch 143. It is to be noted that relay 139 is deenergized for closing the circuit to wire 137 while relay 140 must be energized, thereby providing the basis for reversing the motor.

Motor circuit 138 is also controlled by relay 139 and switch 143 independently of the control thereof by relay 140 and switch 147. This control is obtained by having wire 138 connected to a stationary contact of relay 139 engaged by armature 141 in the energized position thereof, and also to a stationary contact of relay 140 engaged by armature 145 in the deenergized position thereof.

This control of motor circuits 137 and 138 provides for manual control of motor 130 so as to secure its operation in either direction, as well as the automatic control and reversing obtained by relays 139 and 140.

Switches 143 and 147 are conventional snaptype switches available in commerce and are illustrated in Figs. 14 to 19, each comprising a housing 148 formed with openings 149 receiving mounting screws 150 that extend through openings in supporting bracket 151 of suitable insulating material. Supporting bracket 151 is in turn engaged with bosses 118 in the manner shown in Figs. 14, 15 and 19, the screw threaded ends of screws 150 engaging in threaded sockets in bosses 118. Each of the switches is provided with a pair of contacts connected in circuit as above described and a movable switch member 152 illustrated diagrammatically in Fig. 20 is actuated by means of a movable pin 153. As the construction of the switch is conventional the details are not illustrated because any suitable switch for closing the circuit under the conditions herein described will be sufficient for the control of the apparatus.

Switch supporting bracket 151 is formed with a bearing 154 as indicated in Fig. 17 to rotatably mount operating shaft 155. A pin 156 projects laterally to shaft 155 and secures collar 157 on one end of said shaft by extending through registering openings in said collar and shaft. The free end of said pin 156 extends between movable pins 153 (Fig. 19) so that rotation of shaft 155 in either direction will actuate one of the pins 153 and operate movable switch member 152 of one of the switches to close the circuit controlled thereby.

Shaft 155 is positioned with one end of collar 157 engaged with the end of supporting bracket 151 in recess 158. The other end of shaft 155 projects beyond the other end of supporting bracket 151 where it mounts operating cross head 159. Shaft 155 projects into a transverse bore in said cross head and set screw 160 screw threaded in bore 161 of cross head 159 securely fastens said cross head to said shaft against relative movement. Adjustment of the cross head on shaft 155 prevents endwise movement of the shaft in the supporting bracket.

The ends of cross head 159 terminate under openings 117 and support a pair of buttons 162 and 163 respectively, having shoulders at their lower ends to engage the under face of base 115 to thereby limit the upward movement of the buttons through holes 117. This upward movement however is not restricted by the shoulders in such a way that it will interfere with the operation of switches 143 and 147.

By depressing button 162 controlling the circuit through relay 139 and switch 143 operation of the motor in one direction is obtained while it is always necessary to depress button 163 to obtain operation of the motor in the opposite direction by purely manual control.

Automatic control of the motor for operation in both directions is obtained by relays 139 and 140 so long as either button 162 or 163 is held depressed to close the circuit at the button. For this automatic control, transformers 164 and 164' have the primaries connected across current supply wires 135 and 136 and through switches 143 and 147 respectively by means of wires 180 and 181 connecting the primaries to wires 142 and 146 respectively. This provides a control on the transformers so that they are energized only through the operation of the respective controlling switches.

The secondary of transformer 164 has one terminal grounded at 165, and the other terminal connected by wire 166 to one terminal of electromagnet 167 of relay 139. The other terminal of electromagnet 167 is connected by wire 169 to terminal 170 (Fig. 20) corresponding to one of the contacts 51 of the instrument illustrated in Fig. 1. One terminal of electromagnet 168 is connected by wire 171 to terminal 172 (Fig. 20) corresponding to the other contact 51 of Fig. 1. Contacts 173 of Fig. 20 correspond to contacts 40 of Fig. 1 and are mounted on holder member 122, Fig. 14. The electric circuit for the secondary is completed by the ground 174 of member 122 to ground 182 of transformer 164' and wire 183 connecting the secondary of transformer 164' to the other terminal of electromagnet 168. Condensers 175 bridge the terminals of each electromagnet as shown in Fig. 20 to reduce arcing between contacts 170, 172 and 173. Resistances 184 in the motor circuit reduce the speed of the motor when its direction is reversed automatically.

With the circuit arranged in this manner, a test strip secured in the holder member of the instrument as illustrated in Figs. 13 to 20 inserted in the same manner as the test strip is inserted in the device illustrated in Fig. 1, will be tested to indicate its stiffness by depressing button 162 for example at the right-hand side of base member 115.

This will close the circuit through switch 143 and energize the motor circuit of conventional motor 130 having a reversible armature, to operate the armature in a direction when the motor is energized to rotate flexing member or pointer 123 to the right over the dial when viewed as illustrated in Fig. 1 for example, until the test strip has been flexed to a point where contacts on members 122 and 123 engage to close the circuit, illustrated in diagrammatic form in Fig. 20 as contacts 170 and 173 indicated at one side of member 122. Upon the closing of these contacts the circuit through electromagnet 167 will be energized through transformer 164 from the main circuit wires 135 and 136 to effect operation of armature 141 to draw it toward the electromagnet and close the circuit through wire 138. This serves to reverse the direction of rotation of the armature so as to move the indicator 123 back toward the index position.

It will be understood, however, that this operation will so take place that immediately upon the engagement of contacts 170 and 173 at one side of member 122 this reversing will take place and almost immediately the reversing of the motor will cause contacts 170 and 173 to be disengaged. Armature 141 will then be operated immediately by its spring to connect the circuit between the armature and wire 137, and as a result, secure operation of the armature in motor 130 in the initial direction. The effect of this operation of the parts as long as button 162 is held in depressed position will be to constantly reverse the motor.

The operation takes place so fast in this reversing operation that pointer or flexing member 123 is held substantially stationary in the flexed position of the test strip at the given degree of bend. It has been found from the operation of this instrument with the motor drive that this flexing of the test strip for obtaining its stiffness index is very sensitive and the flexing is also uniform in all cases on account of the sensitive character of the electrical circuits controlling motor 130.

By depressing button 163 the motor will then be operated in a reverse direction through the medium of the circuits being reversed to the motor by switch 152. The flexing member or pointer 123 will be rotated to the left-hand side of the index point such as indicated in Fig. 1 until contacts 172 and 173 on the opposite side of member 122 engage. The operation of the electromagnet 168 and armature 145 is obtained in a manner similar to that above described for reversing the motor and obtaining the sensitive reading of the stiffness index of the test strip of material with considerable precision. Of course, when the switch buttons 162 and 163 are released the springs in switches 143 and 147 operating pins 153 will return the buttons to the neutral or central position so that both switches will remain open and the flexing member or pointer 123 may be left in the flexed position of the strip.

"Basic stiffness" of the strip may be subsequently read in the same manner as above described in connection with the operation of the instrument as shown in Fig. 1 through the operation of this instrument under the control buttons 162 and 163 in the manner above described.

This motor driven instrument may be used in connection with the sensitive attachment as shown in Fig. 9 in which the control of the circuits is obtained in the same manner as above described in view of the fact that clip member 90 in closing contacts 105 on either contact supporting block will close the circuit connection with contacts 170, 172 and 173 as shown in Fig. 20 through one of the contacts 105 being grounded and the other contact connected by wire 107 to contact 51.

It will thus be seen from the above description that the invention disclosed in this application provides a pair of relatively movable members 26 and 41 with an operating member 57 provided for actuating the member 41 so as to bend test strip 35 as in the case of Fig. 1 to obtain flexing of the strip a given amount limited by engagement of contacts 50 and 40 which in turn operate a signal circuit to energize signal bulb 63 or to provide an automatic control for a power operated testing instrument as shown in Figs. 13 to 20 in which the operation is started and manually controlled by push buttons 162 and 163.

What is claimed is:

1. An instrument for measuring the stiffness of flexible materials, comprising a pair of relatively movable members, means for retarding movement of one of said members relative to the other, one of said members having means for supporting one end of a strip of material of fixed size to be tested with the other end adapted to engage the other member, said members being operable to secure flexing of said strip in relative movement, means on one of said members for engaging the other to limit relative movement of said members and flexing of said test strip to a given amount, and means for indicating the stiffness of said strip when flexed said given amount.

2. An instrument for measuring the stiffness of flexible materials, comprising a pair of relatively movable members, means for retarding movement of one of said members relative to the other, one of said members having means for supporting one end of a test strip with the other end adapted to engage the other member, said members being operable to secure flexing of said strip in relative movement, projections on one of said members for engaging and limiting movement of the other member relative thereto and also limiting flexing of said test strip to a given amount, and a register to indicate the stiffness index of said strip when flexed said given amount.

3. An instrument for measuring the stiffness of flexible materials, comprising a pair of relatively movable members, one of said members having means for supporting one end of a test strip of flexible material with the other end adapted to engage the other member, force exerting means for resisting movement of one of said members, said members being operable to secure flexing of said strip in relative movement, cooperating contact means on said members, means cooperating with said contact means to indicate when said strip has been flexed a given amount, and a register for indicating the stiffness of said strip when flexed said given amount.

4. An instrument for measuring the stiffness of flexible materials, comprising a pair of relatively movable members, one of said members having means for supporting one end of a test strip of flexible material with the other end adapted to engage the other member, force exerting means for resisting movement of one of said members, said members being operable to secure flexing of said strip in relative movement, cooperating contact means on said members engageable to limit relative movement of said members and flexing of said strip to a given amount, electric indicating means controlled by said contact means for indicating when said strip has been flexed said given amount, and a register for indicating the stiffness of said strip when flexed said given amount.

5. An instrument for measuring the stiffness of flexible materials, comprising a pair of relatively movable members, one of said members having means for supporting one end of a test strip of flexible material with the other end adapted to engage the other member, force exerting means for resisting movement of one of said members, said member being operable to secure flexing of said strip in relative movement alternately in opposite directions, a pair of arms on one of said members lying in the path of movement of the other member to engage and limit relative movement of said members in both directions and also limit flexing of said strip in both directions to a given amount, and a register for indicating the stiffness of said strip when flexed said given amount in both directions.

6. An instrument for measuring the stiffness of flexible materials, comprising a pair of relatively movable members, one of said members having means for supporting one end of a test strip of flexible material with the other end adapted to engage the other member, force exerting means for resisting movement of one of said members, said members being operable to secure flexing of said strip in relative movement alternately in opposite directions, a pair of arms on one of said members lying in the path of movement of the other member to engage and limit relative movement of said members in both directions and also limit flexing of said strip in both directions to a given amount, electrical indicating means actuated by said members at their limit of movement to indicate when said strip is flexed said given amount in both directions, and a register for indicating the stiffness of said strip when flexed said given amount in each direction.

7. An instrument for measuring the stiffness of flexible materials, comprising a pair of relatively movable members, one of said members having means for supporting one end of a test strip of flexible material with the other end adapted to engage the other member, force exerting means for actuating one of said members to normally retain it in one position, an actuating means for moving the other of said members relative to the last-mentioned member to flex said test strip, one of said members having means to engage and limit movement of the other member relative thereto and to limit flexing of said strip to a given amount and means for registering the stiffness index of said strip when flexed said given amount.

8. An instrument for measuring the stiffness of flexible materials, comprising a pair of relatively movable members, one of said members having means for supporting one end of a test strip of flexible material with the other end adapted to engage the other member, means normally maintaining one of said members in one position, power actuating means for operating the other of said members relative to the last-mentioned of said members to flex said strip, means for controlling said power actuating means operable to limit flexing of said strip to a given amount, and a register for indicating the stiffness of said strip when flexed said given amount.

9. An instrument for measuring the stiffness of flexible materials, comprising a pair of relatively movable members, one of said members having means for supporting one end of a test strip of flexible material with the other end adapted to engage the other member, means normally maintaining one of said members in one position, power actuating means for operating the other of said members to flex said strip in either of two directions, and combined manual and automatically operated control means for said power actuating means to limit flexing of said strip in both directions to a given amount, and a register for indicating the stiffness of said strip when flexed said given amount in each drection.

10. An instrument for measuring the stiffness of flexible materials, comprising a pair of relatively movable members, one of said members having means for supporting one end of a test strip of flexible material with the other end adapted to engage the other member, means for normally maintaining one of said members in one position, power actuating means for operating the other member relative to the one operated by said last-mentioned means to flex said strip in either of two directions, means for manually controlling said power actuating means for alternately operating said members in opposite directions, means actuated by said members for controlling operation of said power actuating means to limit relative movement in each direction and the flexing of said strip to a given amount, and a register for indicating the stiffness of said strip when flexed said given amount in each direction.

11. An instrument for measuring the stiffness of flexible materials, comprising a holder for supporting one end of a strip of flexible material of fixed size to be tested, means for normally maintaining said holder in one position, a pointer for engaging the other end of said strip and movable relative to said holder to flex said strip, an indicator scale cooperating with said pointer to register the stiffness of said strip when flexed a given amount, means for limiting flexing of said strip to a given amount, and an operating member connected to said pointer for moving said pointer to flex said strip when said member is actuated.

12. An instrument for measuring the stiffness of flexible materials, comprising a holder for supporting one end of a strip of flexible material of fixed size to be tested, force exerting means for resisting movement of said holder, a pointer for engaging the other end of said strip and movable relative to said holder to flex said strip, an indicator scale cooperating with said pointer to register the stiffness of said strip when flexed a given amount, means for limiting flexing of said strip to a given amount, and means for illuminating said indicator scale adjacent said pointer actuated by said holder and pointer when said strip has been flexed said given amount.

13. An instrument for measuring the stiffness of flexible materials, comprising a holder for supporting one end of a strip of flexible material of fixed size to be tested, means for normally maintaining said holder in one position, a pointer for engaging the other end of said strip and movable relative to said holder to flex said strip, an indicator scale cooperating with said pointer to register the stiffness of said strip when flexed a given amount, a pair of arms on said pointer adapted to engage said holder to limit relative movement of the pointer to the holder and flexing of said strip to a given amount, an operating member connected to said pointer for operating the pointer to flex said strip, electric illuminating means on said operating member for illuminating said indicator scale adjacent said pointer, and circuit control means for said illuminating means on said arms operable when said arms engage said holder to close the circuit for energizing said illuminating means when said strip has been flexed said given amount.

14. An instrument for measuring the stiffness of flexible materials, comprising an upright supporting member, a shaft rotatable in said supporting member, a dial plate on said supporting member having a scale thereon, an indicator arm on said shaft overlying said dial plate and cooperating with said scale, a holder rotatably mounted on said shaft for holding an end of a test strip of flexible material, force exerting means normally retaining said holder in one position, an operating arm on said shaft at the opposite side of said dial plate from said indicator arm for rotating said shaft and indicator arm, means on said indicator arm for engaging the other end of said test strip for flexing said test strip in said holder when said indicator arm is moved by operating said operating arm, an electric light on said operating arm for illuminating said dial plate and scale, and cooperating means actuated by said indicator arm and holder to energize the circuit to said electric light when said strip has been flexed a given amount to show the stiffness of said strip as registered by the co-operation of the indicator arm with the scale.

15. An attachment for an instrument for measuring the stiffness of flexible materials comprising a pair of movable members, means for retarding movement of one of said members relative to the other, one of said members having clamping means to normally hold one end of a test strip, the other member having means to engage the other end of a test strip, comprising an element having means on one end for engagement and clamping in the clamping means of the first-mentioned member and means on the opposite end of said element for detachable connection with said other member for securing said members together against relative movement, strip clamping means on said element for one end of a flexible test strip, said members being operable to move said element to secure flexing of a test strip mounted therein, and a register for indicating the stiffness of a test strip when flexed in said element a given amount.

16. An attachment for an instrument for measuring the stiffness of flexible materials comprising a pair of movable members, means for retarding movement of one of said members relative to the other, one of said members having means for normally supporting one end of a test strip of flexible material with the other end adapted to engage the other member, said members being normally operable to secure flexing of said strip in relative movement, and a register for indicating the stiffness of said material when flexed a given amount, comprising an element for engaging said means on the first-mentioned member and also engaging said second-mentioned member for retaining said members in fixed relation against relative movement, said element having flexible test strip clamping means for clamping one end of a test strip, said members being operable to operate said element to secure flexing of said test strip therein, and said register cooperating with said element to indicate the stiffness of said strip when flexed a given amount.

17. An attachment for an instrument for measuring the stiffness of flexible materials comprising a pair of movable members, means for retarding movement of one of said members relative to the other, one of said members having means for normally supporting one end of a test strip of flexible material with the other end engaging the other member, said members being normally operable to secure flexing of said strip in relative movement, and a register for indicating the stiffness of said material when flexed a given amount, comprising an element having opposite ends connected to said members to secure them together against relative movement, said element having test strip clamping means thereon, and means to limit flexing of a test strip therein, said members being operable to secure operation of the element therewith to secure flexing of a test strip in said element, and said register cooperating to indicate the stiffness of said strip when flexed a given amount in said element.

18. An attachment for an instrument for measuring the stiffness of flexible materials comprising a pair of movable members, means for retarding movement of one of said members relative to the other, one of said members having means for normally supporting one end of a test strip of flexible material with the other end adapted to engage the other member, said members being normally operable to secure flexing of said strip in relative movement, and a register for indicating the stiffness of said material when flexed a given amount, comprising an element including a body member having a part on one end engaged and supported in the means for supporting a strip on the first-mentioned member, parts on the opposite end for cooperative engagement with the other member to connect said members for movement in unison, a clamp on said element for a flexible test strip, and arms on said element for engaging and limiting flexing of said test strip in said clamp, said register cooperating with said members and element to register the stiffness of said strip when flexed a given amount.

19. In an instrument for measuring the stiffness of flexible materials, an attachment comprising a body member, laterally projecting parts on each end thereof, a clamp mounted on one of said laterally projecting parts for clamping one end of a test strip of flexible material having the other end terminating in close proximity with the part on the other end, and a pair of arms projecting from one of said parts for limiting flexing of said test strip to a given amount.

20. An instrument for measuring the stiffness of flexible materials, comprising a pair of relatively movable members, one of said members having means for supporting one end of a test strip with the other end adapted to engage the other member, means for retarding movement of one of said members relative to the other, power actuating means for operating the other of said members, manual control means for setting said power actuating means into operation, test strip controlled means for stopping and reversing the operation of said power actuating means and operable to maintain said members in a position to hold a test specimen flexed a given amount, and a register for indicating the stiffness of said strip when flexed said given amount.

21. An instrument for measuring the stiffness of flexible materials, comprising a pair of relatively movable members, one of said members having means for supporting one end of a test strip with the other end adapted to engage the other member, means for retarding movement of one of said members relative to the other, electric power driving means for operating the other member, manually actuated electric circuit controls for said driving means selectively operable to cause said driving means to operate in either of two directions, and electrically operated control means operable automatically when said test strip is flexed a given amount for stopping and reversing said driving means and for maintaining said test strip flexed said given amount, and a register for indicating the stiffness of said strip when flexed said given amount.

22. An instrument for measuring the stiffness of flexible materials, comprising a pair of relatively movable members, one of said members having means for supporting one end of a test strip with the other end adapted to engage the other member, means normally retarding movement of one of said members relative to the other, an electric motor drive means for actuating the other of said members, a pair of independent selectively and manually energized circuits for energizing said motor drive means for operation in opposite directions, electromagnetic control means for deenergizing said circuits and energizing independent reversing circuits to said drive means, circuit means controlling operation of said electromagnetic means energized for operation when said test strip is flexed a given amount, whereby said drive means is actuated to flex and retain said test strip flexed a given amount, and a register for indicating the stiffness of said strip when flexed said given amount.

23. An instrument for measuring the stiffness of flexible materials, comprising a support, a holder movably mounted on said support for holding a strip of given size to be tested, means for normally retaining said holder in a given position, means for flexing said strip relative to said holder and said retaining means, means for limiting movement of said holder and retaining means relative to said flexing means, and a register for indicating the stiffness of said material when flexed a given amount.

24. An instrument for measuring the stiffness of flexible materials, comprising a support, a holder movably mounted on said support for holding a strip of given size to be tested, means normally retaining the holder in one position, a flexing member movable on said support for flexing said strip in said holder, means for limiting flexing of said strip, a scale on said support and a pointer operable by said flexing member for indicating on said scale the stiffness of said material when flexed a given amount.

25. An instrument for measuring the stiffness of flexible materials, comprising a support, a holder movably mounted on said support for holding one end of a test strip of given length, a given weight for normally retaining said holder in a given position, a flexing member movable on said support having a portion for engaging the opposite end of said strip and capable of flexing said strip in the holder, means for limiting flexing of said strip to a given amount, a pointer actuated by said flexing member, and a scale on said support for registering the stiffness of said material in cooperation with the pointer when said strip has been flexed a given amount.

26. An instrument for measuring the stiffness of flexible materials, comprising a support, a holder movably mounted on said support for holding a test strip of given size, a given weight for normally holding said holder and strip in vertical position, a flexing member movably mounted on said support for alternately flexing said strip out of said vertical plane in opposite directions in opposition to said weight, means for limiting flexing of said strip, and a register for registering the stiffness of said material when flexed a given amount in each direction.

27. An instrument for measuring the stiffness of flexible materials, comprising a support, a holder movably mounted on said support for holding a test strip of given size, a given weight movably mounted on said support normally holding said holder and test strip in vertical position against deflection in either direction, a flexing member for flexing said test strip to both sides of the normal vertical position, means for limiting flexing of said strip, a scale on said support graduated to register the stiffness of materials, and a pointer actuated by said flexing member for indicating the stiffness of said strip of material on said scale when said strip is flexed a given amount.

28. An instrument for measuring the stiffness of flexible materials, comprising a pair of relatively movable members, one of said members having means for supporting one end of a strip of material of fixed size to be tested with the other end engaging the other member, said members being operable to secure flexing of said strip in relative movement alternately in opposite directions, means to limit flexing of said strip to a given amount in each direction, and means for indicating the stiffness of said strip when flexed in both directions said given amount.

29. An instrument for measuring the stiffness of flexible materials, comprising a holder for a strip of material of fixed size to be tested, means for flexing said strip in said holder alternately in opposite directions, means for limiting flexing of said strip in both directions to a given amount, and a register for indicating the stiffness of said strip when flexed said given amount in each direction.

30. An instrument for measuring the stiffness of flexible materials, comprising a pair of relatively movable members, one of said members having means for supporting a test strip of given size in normal or unstressed position, the other member having means for engaging said strip for cooperation with the first mentioned member to flex said strip in opposite directions out of said normal position in relative movement of said members in two directions, said members cooperating with the strip to limit the flexing of said strip, a dial provided with a scale having its origin at said normal or unstressed position of said strip and stiffness index graduations thereon extending in opposite directions from said origin, an indicator cooperating with said dial and graduations, one of said members cooperating to actuate said dial and indicator relative to each other to register the stiffness of the test strip when flexed a given amount in both directions.

31. An instrument for measuring the stiffness of flexible materials, comprising a pivoted holder adapted to clamp one end of a test strip of material, a pointer adapted to releasably engage the free end of the test strip, a common pivot for said holder and pointer, a scale having its origin adjacent to the normal or unstressed position of the test strip, said pointer being movable across the scale alternately in opposite directions to flex said test strip in opposite directions, and means for limiting the amount the test strip is flexed, said pointer cooperating with said scale to indicate the stiffness of said strip at the limit of its flexing in each direction.

32. An instrument for measuring the stiffness of flexible materials, comprising a holder for a strip of material of given length for testing, means for flexing said material relative to said holder including means spaced proportionately to the length of said material for limiting flexing to a given amount without permanently deforming or fracturing said material, and means for registering the stiffness of said material when flexed said given amount.

33. An instrument for measuring the stiffness of flexible materials, comprising a holder for a strip of material of fixed size to be tested, means for flexing said material in said holder, a weight connected to said holder for cooperating in flexing said strip, means for limiting the flexing of said strip to a given amount without permanent fracture or deformation, and a register for indicating the stiffness of said strip actuated in the operation of said means and weight.

34. An instrument for measuring the stiffness of flexible materials, comprising a support, a weighted holder mounted for free gravitational movement on said support for supporting a strip of flexible material of given size to be tested, means movable alternately in opposite directions on said support relative to said weighted holder for alternately flexing said strip in said holder in opposite directions, and means for registering the stiffness of said material when said strip has been flexed a given amount in both directions.

RALPH F. TABER.